(12) United States Patent
Hayes

(10) Patent No.: US 6,650,247 B1
(45) Date of Patent: Nov. 18, 2003

(54) SYSTEM AND METHOD FOR CONFIGURING A HOME APPLIANCE COMMUNICATIONS NETWORK

(75) Inventor: Patrick H. Hayes, Mission Viejo, CA (US)

(73) Assignee: Universal Electronics Inc., Cypress, CA (US)

( * ) Notice: Subject to any disclaimer, the term of this patent is extended or adjusted under 35 U.S.C. 154(b) by 0 days.

(21) Appl. No.: 10/079,377

(22) Filed: Feb. 20, 2002

(51) Int. Cl.[7] .................. G05B 19/02; G08C 19/00; H04N 5/44
(52) U.S. Cl. ............... 340/825.22; 340/825.69; 340/825.72; 348/734
(58) Field of Search ............. 340/825.22, 825.25, 340/825.71, 825.72, 825.69; 359/142, 146; 348/734

(56) References Cited

U.S. PATENT DOCUMENTS

| | | |
|---|---|---|
| 4,626,848 A | 12/1986 | Ehlers |
| 4,746,919 A | 5/1988 | Reitmeier |
| 5,255,313 A | 10/1993 | Darbee |
| 5,410,326 A | 4/1995 | Goldstein |
| 5,519,457 A | 5/1996 | Nishigaki et al. |
| 5,550,642 A | 8/1996 | Kim et al. |
| 5,552,917 A | 9/1996 | Darbee et al. |
| 5,726,645 A | 3/1998 | Kamon et al. |
| 5,805,926 A * | 9/1998 | Le Van Suu ............ 341/176 |
| 5,815,297 A * | 9/1998 | Ciciora ................ 359/146 |
| 5,819,294 A | 10/1998 | Chambers |
| 5,909,183 A | 6/1999 | Borgstahl et al. |
| 5,936,667 A | 8/1999 | Saib et al. |
| 5,959,539 A | 9/1999 | Adolph et al. |
| 6,057,874 A | 5/2000 | Michaud |
| 6,107,951 A * | 8/2000 | Katayama et al. ........ 340/825.25 |
| 6,127,941 A | 10/2000 | Van Ryzin |
| 6,255,961 B1 | 7/2001 | Van Ryzin et al. |
| 6,278,499 B1 | 8/2001 | Darbee et al. |
| 6,344,817 B1 | 2/2002 | Verzulli |
| 6,549,719 B2 * | 4/2003 | Mankovitz ............ 348/734 |
| 2002/0089427 A1 * | 7/2002 | Aratani et al. ......... 340/825.72 |

FOREIGN PATENT DOCUMENTS

| | | |
|---|---|---|
| EP | 1168124 A2 | 1/2002 |
| WO | WO 00/17738 | 3/2000 |
| WO | WO 01/24387 A1 | 4/2001 |
| WO | WO 01/39150 A3 | 5/2001 |

OTHER PUBLICATIONS

NEC Corporation, 78K/0 Series, 8-bit Single-chip Microcontroller, Basic III, 1995, pp. 120-123.

* cited by examiner

Primary Examiner—Brian Zimmerman
Assistant Examiner—Clara Yang
(74) Attorney, Agent, or Firm—Mark R. Galis; Gary R. Jarosik

(57) ABSTRACT

A system and method for configuring a target controlling appliance to communicate with a target controlled appliance. Setup information is supplied to a remote control to configure the remote control to communicate command codes to the target controlled appliance. A representation of configuration data is transmitted in a configuration message to the target controlling appliance. The target controlling appliance uses the representation of the configuration data to automatically configure itself to communicate command codes to the target controlled appliance. In particular, the target controlling appliance uses the representation of the configuration data to select those command codes in a command code library that are recognizable by the target controlled appliance. The command code library could be local or remote to the target controlling appliance.

12 Claims, 5 Drawing Sheets

REMOTE CONTROL BLOCK DIAGRAM

SYSTEM AND METHOD FOR CONFIGURING A HOME APPLIANCE COMMUNICATIONS NETWORK

BACKGROUND OF THE INVENTION

The present invention relates generally to home appliance control and, more particularly, to a system and method for configuring a home appliance communications network.

As described in U.S. Pat. No. 6,057,874, which is incorporated herein by reference in its entirety, cable TV operators typically provide their consumers with a cable converter box which functions as the interface between the cable communication network and the television/VCR of the consumer. The use of a cable converter box in a home entertainment system, however, creates difficulties for many consumers due to the inconveniences associated with using the cable converter box in conjunction with the other home appliances in the home entertainment system. For example, in order for a consumer to use their VCR to record a program being broadcast over the cable communication network, the consumer must coordinate the setting of the VCR and the setting of the cable converter box. If any of these home appliances are not set correctly, the attempt to record the program will be unsuccessful.

To solve this problem, manufacturers have provided cable converter boxes with the ability to remotely control the operation of the VCR. To this end, the cable converter box is provided with an infrared (IR) blaster which is used to transmit control codes from the cable converter box to the VCR. There are, however, several drawbacks to current cable converter boxes which include an IR blaster. One of the primary drawbacks is that there are many different types of VCRs and a correspondingly large number of different control codes. To be compatible with all VCRs, each cable converter box must have access to a library of VCR control codes for each of the VCRs. The consumer must then manually configure the cable converter box to select the appropriate control codes for controlling the VCR owned by the consumer. Unfortunately, requiring the cable converter box to be manually configured increases the likelihood that a configuration error may be introduced into the home theater communications network. This is especially true since consumers are unlikely to check that the cable converter box was configured correctly until such time after a desired program recording was missed.

Communications between home appliances in a home entertainment system need not be limited to transmissions originating from a cable box. For example, as described in U.S. Pat. No. 5,550,642, which is incorporated herein by reference in its entirety, a VCR can also include circuitry for controlling a cable converter box. Thus, as the number of home appliances that need to be manually configured for control communications increase, the likelihood of introducing errors into the communications network correspondingly increases.

SUMMARY OF THE INVENTION

To overcome these and other problems, the subject invention resides in a system and method for configuring a target controlling appliance to communicate with a target controlled appliance. Setup information is supplied to a remote control to configure the remote control to communicate command codes to the target controlled appliance. A representation of configuration data is transmitted in a configuration message to the target controlling appliance. The configuration data is used within the remote control to select command codes from a command code library and results from the remote control setup procedure. The target controlling appliance uses the representation of the configuration data to automatically configure itself to communicate command codes to the target controlled appliance. In particular, the target controlling appliance uses the representation of the configuration data to select those command codes in a command code library that are recognizable by the target controlled appliance. The command code library could be local or remote to the target controlling appliance.

A better understanding of the objects, advantages, features, properties and relationships of the invention will be obtained from the following detailed description and accompanying drawings which set forth an illustrative embodiment and which are indicative of the various ways in which the principles of the invention may be employed.

BRIEF DESCRIPTION OF THE DRAWINGS

For a better understanding of the invention, reference may be had to a preferred embodiment shown in the following drawings in which.

DETAILED DESCRIPTION

Figure 1:
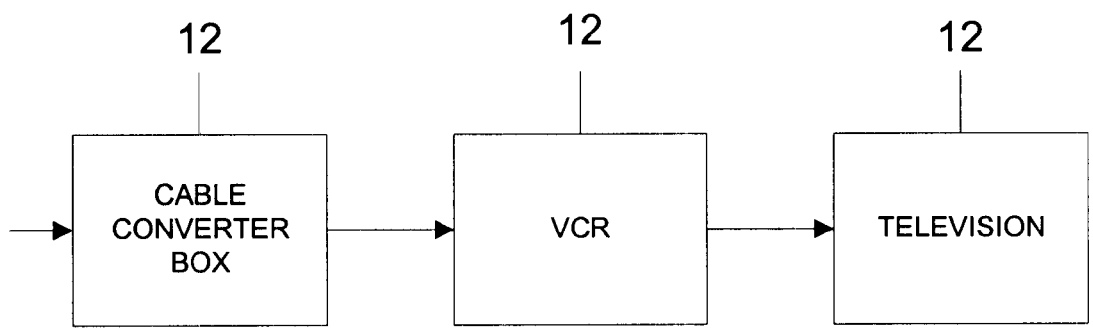
FIG. 1 illustrates a system for configuring a home appliance communications network in accordance with the subject invention.
Figure 1:
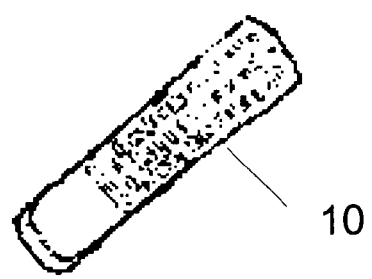

Turning now to the figures, wherein like reference numerals refer to like elements, a system for configuring the control capabilities of one or more home appliances 12 using a remote control 10 is illustrated in FIG. 1. As will be described in greater detail hereinafter, the remote control 10 is first configured (or setup) to communicate with the each of the home appliances 12. The information used to configure the remote control 10 may then be forwarded to the home appliances 12. The home appliances 12 use the remote control configuration information to select from their command code libraries (which may be locally or remotely stored) the appropriate control codes for commanding the operation of other ones of the home appliances 12. In this regard, the home appliances 12 can include, but are not limited to televisions, VCRs, DVD players, cable converter boxes, amplifiers, CD players, game consoles, home lighting, drapery, etc. Since the consumer often has immediate feedback that the remote control 10 was configured with the correct information to control a home appliance 12 (especially if the remote control was configured using a step and set method), the use of this same information to configure the home appliances 12 for inter-appliance communications virtually ensures that no configuration errors will be introduced into the appliance communications network.

Figure 2:
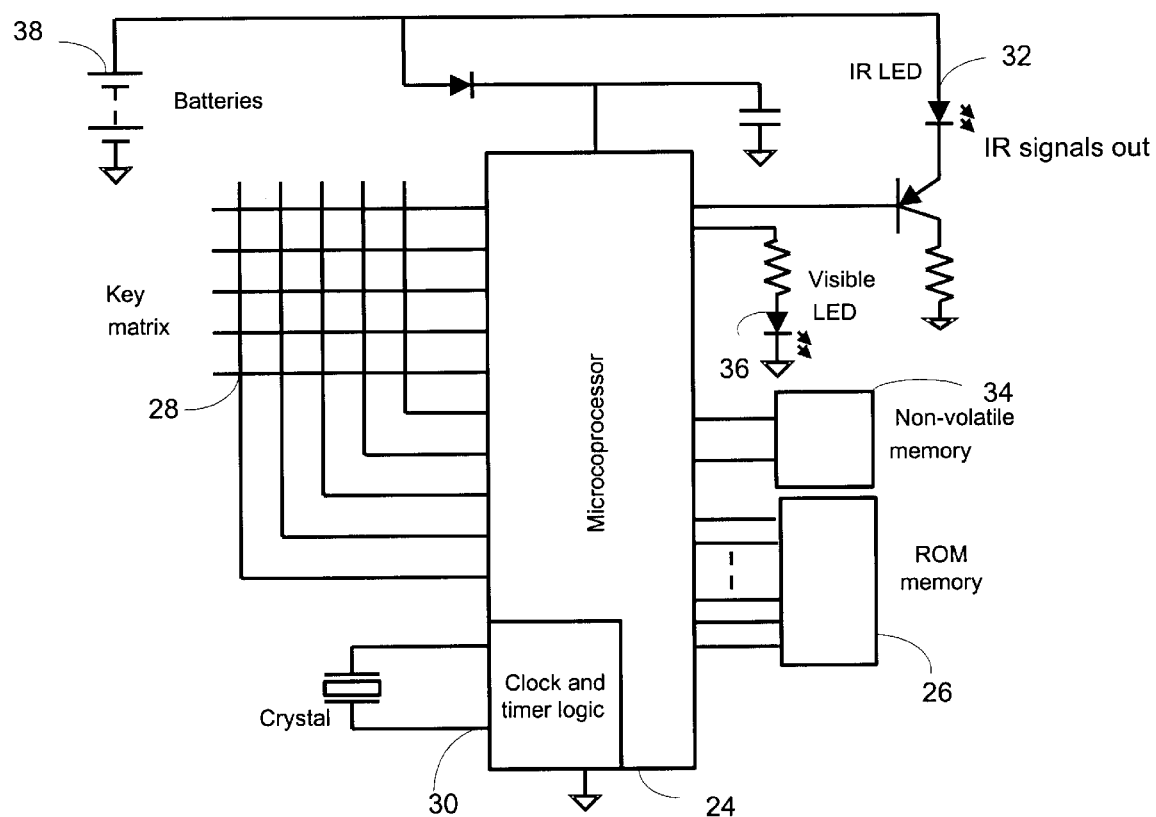
FIG. 2 illustrates a block diagram of an exemplary remote control of the system illustrated in FIG. 1.

For communicating with the consumer appliances 12, the remote control 10 preferably includes a processor 24 coupled to a ROM memory 26, a key matrix 28 (in the form of physical buttons, a touch screen, or the like), an internal clock and timer 30, an IR (or RF) transmission circuit 32, a non-volatile read/write memory 34, a visible LED 36 (to provide visual feedback to the user of the remote control 20), and a power supply 38 as illustrated in FIG. 2. The ROM memory 26 includes executable instructions that are intended to be executed by the processor 24 to control the operation of the remote control 10. In this manner, the processor 24 may be programmed to control the various electronic components within the remote control 10, e.g., to monitor the power supply 38, to cause the transmission of signals, etc. Meanwhile, the non-volatile read/write memory 34, for example an EEPROM, battery-backed up RAM, Smart Card, memory stick, or the like, is provided to store setup data and parameters as necessary. While the memory 26 is illustrated and described as a ROM memory, memory 26 can be comprised of any type of readable media, such as ROM, RAM, SRAM, FLASH, EEPROM, or the like. Preferably, the memory 26 is non-volatile or battery-backed such that data is not required to be reloaded after battery changes. In addition, the memories 26 and 34 may take the form of a chip, a hard disk, a magnetic disk, and/or an optical disk.

For commanding the operation of home appliances of different types and manufacturers, the memory 26 also includes a command code library. The command code library is comprised of a plurality of command codes that may be transmitted from the remote control 10 for the purpose of controlling the operation of the home appliances 12. The memory 26 also includes instructions which the processor 24 uses in connection with the transmission circuit 32 to cause the command codes to be transmitted in a format recognized by the target home appliance 12.

To identify home appliances 12 by type and manufacturer (and sometimes model) such that the remote control 10 is adapted to transmit recognizable command codes in the format appropriate for such identified home appliances 12, data may be entered into the remote control 10. Since methods for setting up a remote control 10 to control the operation of specific home appliances 12 are well-known, they will not be described in greater detail herein. Nevertheless, for additional information pertaining to remote control setup, the reader may turn to U.S. Pat. Nos. 6,157,319, 5,614,906, 4,959,810, 4,774,511, 4,703,359, and 5,872,562, among others, which are incorporated herein by reference in their entirety.

To cause the remote control 10 to perform an action, the remote control 10 is adapted to be responsive to events, such as a sensed user interaction with one or more keys on the key matrix 28. More specifically, in response to an event appropriate instructions within the memory 26 are executed. For example, when a command key is activated on the remote control 10, the remote control 10 may read the command code corresponding to the activated command key from memory 26 and transmit the command code to a home appliance 12 in a format recognizable by the home appliance 12. It will be appreciated that the instructions within the memory 26 can be used not only to cause the transmission of command codes to home appliances 12 but also to perform local operations. While not limiting, local operations that may be performed by the remote control 10 include favorite channel setup, macro button setup, command function key relocation, etc. Since examples of local operations can be found in U.S. Pat. Nos. 5,481,256, 5,959, 751, 6,014,092, which are incorporated herein by reference in their entirety, they will not be discussed in greater detail herein.

Figure 3:
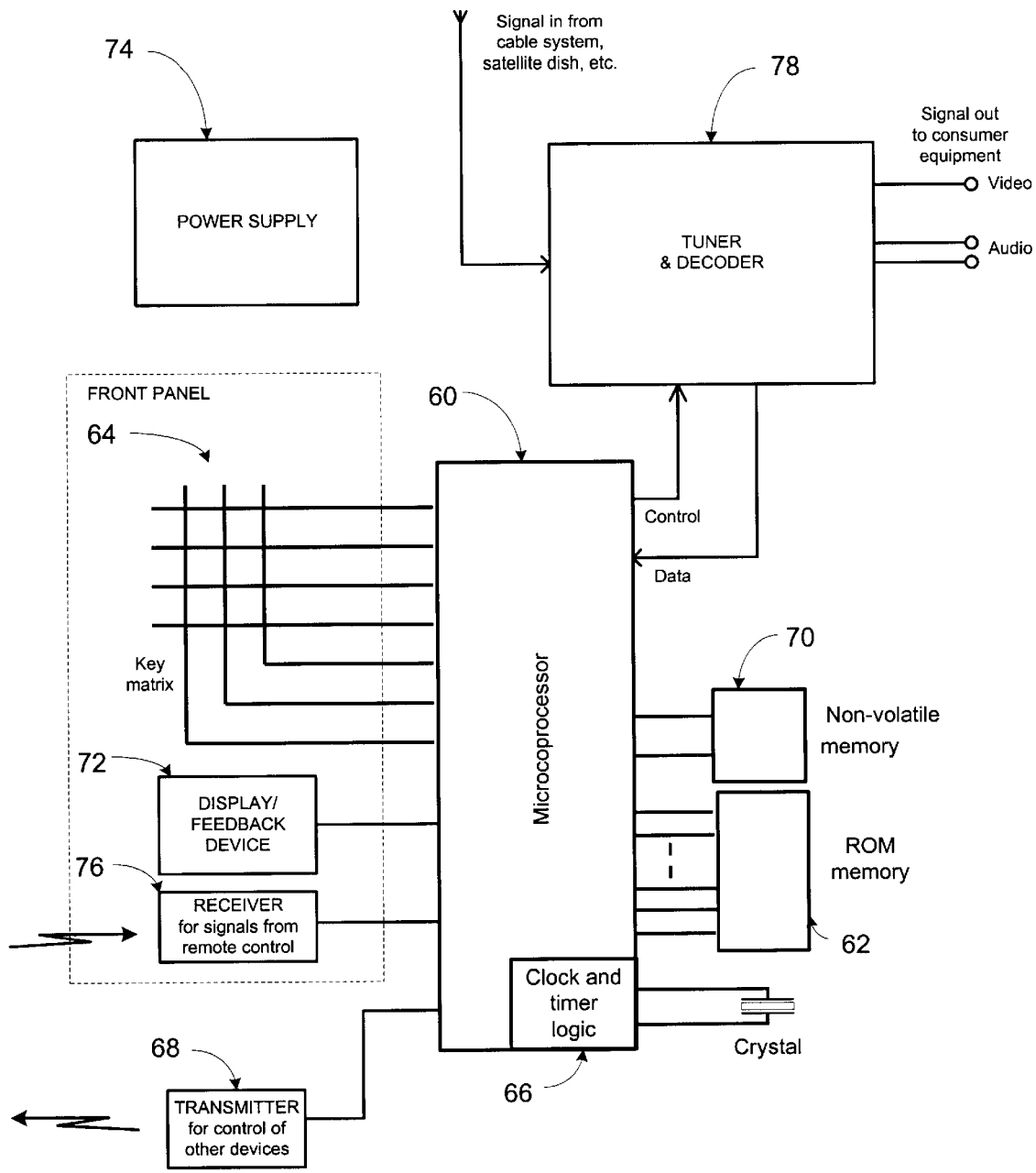
FIG. 3 illustrates a block diagram of an exemplary home appliance of the system illustrated in FIG. 1.
Figure 4:
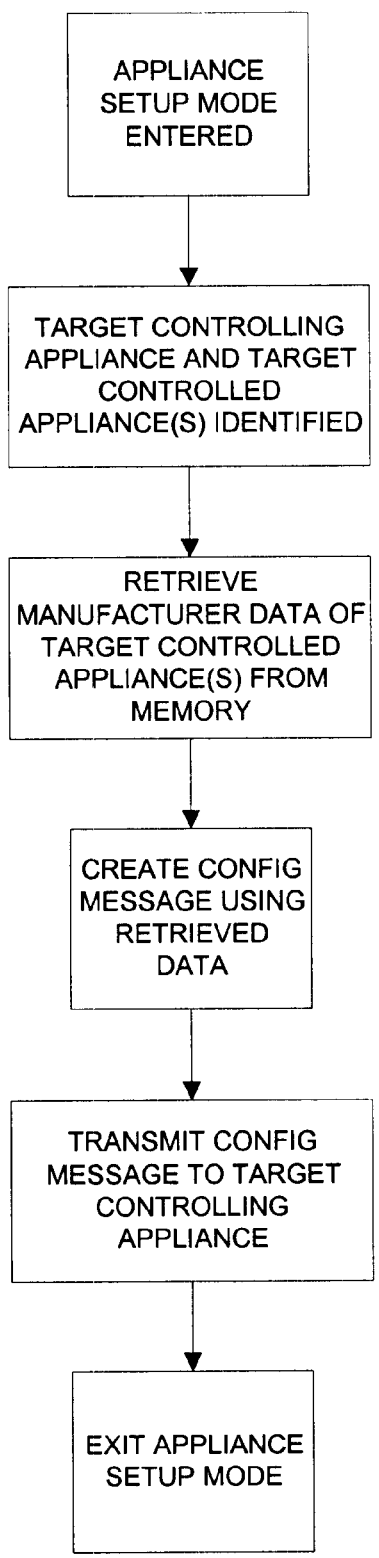
FIG. 4 is a flow chart diagram of an exemplary method for using the remote control of FIG. 1 to transmit configuration information to a home appliance.
Figure 5:
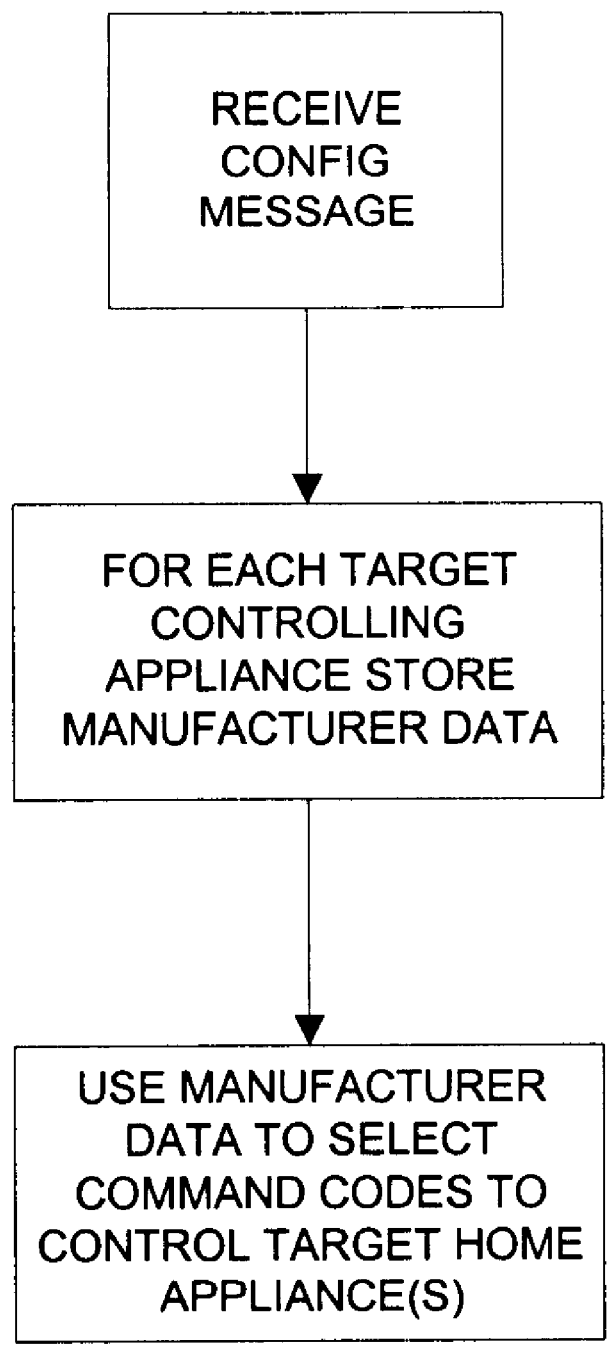
FIG. 5 is a flow chart diagram of an exemplary method for using the configuration information to configure a home appliance to command the operation of another home appliance.

For use in transmitting communications between the home appliances 12, each home appliance 12 may include components that are similar to the components within the remote control 12. To this end, as illustrated in FIG. 3, the home appliance 12 may include a processor 60 coupled to a ROM memory 62, a key matrix 64, an internal clock and timer 66, an IR (or RF) transmission circuit 68, a non-volatile read/write memory 70, a visible feed back device such as an LED or display 72, and a power supply 74. Thus, it will be appreciated that the home appliance 12, when equipped as shown with a transmission circuit 68, can also be generally considered to have remote control capabilities.

The ROM memory 62 includes executable instructions that are intended to be executed by the processor 60 to control the operation of the home appliance 12, typically in response to signals received from the remote control 10, signals received from another home appliance 12, or in response to user activation of one or more keys on the key matrix 64. The non-volatile read/write memory 70, for example an EEPROM, battery-backed up RAM, Smart Card, memory stick, or the like, is provided to store configuration data and parameters as necessary. While the memory 62 is illustrated and described as a ROM memory, memory 62 can be comprised of any type of readable media, such as ROM, RAM, SRAM, FLASH, EEPROM, or the like. Preferably, the memory 70 is non-volatile or battery-backed such that data is not required to be reloaded after lose of power. In addition, the memories 62 and 70 may take the form of a chip, a hard disk, a magnetic disk, and/or an optical disk.

For commanding the operation of other home appliances 12 (of different types and manufacturers), the memories 70 and/or 62 may also include a plurality of command codes that may be transmitted from the home appliance 12 for the purpose of controlling the operation of other home appliances 12. The memories 70 and/or 62 may also include instructions which the processor 60 uses in connection with the transmission circuit 68 to cause the command codes to be transmitted in a format recognized by the target home appliance 12. It will be appreciated that the home appliance 12 also includes a receiving circuit 76 and the memories 70 and/or 62 further include instructions which the processor 60 uses in connection with the receiving circuit 76 to accept, decipher, and act upon transmissions issued by the remote control 10 or other home appliances 12. The particular command codes used to control the operation of other home appliances 12 are selected from a library of command codes which may be locally stored in memories 70 and/or 62, or may be remotely stored at, for example, a cable system headend and downloaded via a data path established through a channel tuner 78 in the manner described in the above referenced U.S. Pat. No. 6,057,874.

To identify other home appliances 12 by type and manufacturer (and sometimes model) such that a controlling home appliance 12 can select the appropriate set of command codes from the command code library to control the other home appliances 12, configuration data is received from the remote control 10. The configuration data can be transmitted by the remote control 10 in response to an express command from the user. In this case, the user may provide the remote control 10 with information identifying the target controlling home appliance 12 (i.e., the appliance to which the configuration information is to be transmitted) and the device to be controlled by the target controlling home appliance 12. For example, the user might enter a set-up appliance mode, activate a first device mode key (e.g., VCR) corresponding to the target controlling appliance and a second device mode key (e.g., cable) corresponding to the appliance the target controlling appliance is to be configured to control (i.e., a target controlled appliance). Thereafter the remote control 10 will transmit a configuration message to the target controlling appliance 12 which the target controlling appliance will use to configure itself to communicate commands to the target controlled appliance 12. It will be understood that, if the identities of the target controlling or target controlled appliances are predetermined (e.g., the remote is used in a system in which only the cable converter box is to be configured to communicate with only the VCR), the steps of identifying appliances to the remote control 10 can be avoided.

The configuration message, transmitted in a format recognizable by the target controlling appliance, may include data indicative of one or more target controlled appliances 12 (i.e., identifying the target controlled appliance type) as well as data indicative of the manufacturer (and sometimes model) of the target controlled appliance. In the case where the target controlling appliance can command the operation of only one predetermined target controlled appliance, data indicative of the target controlled appliance type need not be included in the configuration message. To gather the manufacturer information of a target controlled appliance to include data representative of the manufacturer in the configuration message, the remote control 10 may read its memory 70 in which is stored the setup data for the device modes supported by the remote control 10.

By way of example, the data included in the configuration message may identify the target controlled appliance using a 4-bit device category identifier together with a 12-bit device number identifier as described U.S. Pat. No. 6,157,319, which is commonly assigned and which is incorporated herein by reference in its entirety. Encoding of this data for transmission may use the format described in U.S. Pat. No. 6,157,319 or may be adapted to suit the data encoding scheme already in use by the target controlling appliance for reception of other remote control commands.

By way of further example, in the latter case, a target controlling appliance 12 already equipped to decode the popular "NEC" infrared control format might be adapted to receive the 16 bits of configuration information as follows: each NEC infrared data frame consists of 32 bits which are defined as 16 bits of "custom code" (system address), 8 bits of data payload, and 8 bits of data check. (See for example NEC publication "Application Note 78K/0 Series," FIGS. 5–13 "Remote Controller Signal Transmitter IC Output," document U10182EJ2V0AN00 October 1997 which is incorporated herein by reference in its entirety). For configuration data messages, a unique custom code value different from that of the basic remote control command set is selected. This allows the target device to readily detect the difference between an incoming configuration data message and an incoming remote control command, while also preventing previous generation devices from falsely responding (an NEC-compliant device will ignore received IR data frames with an unexpected custom code.) The 16-bit configuration data value can then be transmitted as two successive IR data frames (8 bits each) prefixed by the unique custom code.

Upon receipt of a configuration message, the target controlling home appliance 12 uses the data contained in the configuration message to configure itself to transmit command codes to other home appliances 12. In this regard, for each type of appliance the target controlling home appliance 12 is intended to control, which may be predetermined or indicated in the configuration message, the target home appliance 12 stores a representation of the data received from the remote 10 in its memory and uses this data to select command codes from the command code library that are appropriate for commanding the operation of the corresponding target controlled appliance type. More specifically, the stored data can be used as an index into a command code library stored in the memory of the target controlling device or as an identifier for use in downloading command codes appropriate for the target controlled device into the memory of the target controlling device. In sum, once the remote control 10 supplies the target controlling appliance 12 with data identifying the IR code set to be used via the configuration message, the target controlling appliance 12 uses the data to automatically configure itself in accordance with set-up procedures that are well known in the art. In this manner, the remote control 10 can be used to automatically configure the home appliances 12 for inter-appliance communications. While the method described above is particularly advantageous when the command code libraries of the remote control and controlling device are supplied by the same vendor and accordingly use a consistent identification scheme for brand/model, it will be appreciated that libraries from different sources may also be accommodated through the use of a brand/model translation table, either in the remote control or the controlling device being set up.

While specific embodiments of the present invention have been described in detail, it will be appreciated by those skilled in the art that various modifications and alternatives to those details could be developed in light of the overall teachings of the disclosure. For example, the functionality of the remote control 10 can be included in other devices such as PDAs, personal computers, home appliances, or the like. Still further, the command codes can be downloaded to the appliance from the remote control 10 as an alternative to being downloaded from a cable headend. In this regard, the whole command code library code be downloaded from the remote control 10. Alternatively, select portions of the command code library could be downloaded from the remote control. The selection can be performed as a function of information received from the target controlling appliance (in a download request) or selected by the remote control as being appropriate commands for use by the target controlling appliance to command the target controlled appliance. Accordingly, it will be understood that the particular arrangements and procedures disclosed are meant to be illustrative only and not limiting as to the scope of the invention which is to be given the full breadth of the appended claims and any equivalents thereof.

What is claimed is:

1. A method for configuring a target controlling appliance to communicate with a target controlled appliance, the method comprising:

using configuration data to identify a plurality of command codes in a first command code library that are recognizable by the target controlled appliance such that the identified plurality of command codes are available to allow the remote control to control operations of the target controlled appliance;

storing the configuration data in a memory of the remote control;

transmitting from the remote control to the target controlling appliance a configuration message created using the configuration data read from the memory of the remote control; and using the configuration message to identify a plurality of command codes in a second command code library that are recognizable by the target controlled appliance to configure the target controlling appliance such that the identified plurality of command codes are available to allow the target controlling appliance to control operations of the target controlled appliance.

2. The method as recited in claim 1, wherein the second command code library is stored on the target controlling appliance.

3. The method as recited in claim 1, wherein the second command code library is stored remotely from the target controlling appliance and the identified plurality of command codes are downloaded into the target controlling appliance.

4. The method as recited in claim 1, wherein the configuration message further includes data representative of a type of the target controlled appliance.

5. The method as recite in claim 1, wherein the configuration data comprises an indicia of a manufacturer of the target controlled appliance.

6. The method as recited in claim 1, wherein the configured target controlling appliance is capable of controlling operations of the target controlled appliance independent of the remote control.

7. The method as recited in claim 6, wherein the configured remote control is capable of controlling operations of the target controlled appliance independent of the target controlling appliance.

8. A method for configuring a target controlling appliance to communicate with a plurality of target controlled appliances, the method comprising:

using configuration data to identify a plurality of command codes in a first command code library that are recognizable by the target controlled appliance such that the identified plurality of command codes are available to allow the remote control to control operations of the target controlled appliance;

storing the configuration data in a memory of the remote control;

transmitting from the remote control to the target controlling appliance a configuration message created using device data indicative of a type of each of the target controlled appliances and the configuration data read from the memory of the remote control; and using the configuration message at the target controlling appliance to identify a plurality of command codes in a second command code library that are recognizable by each of the target controlled appliances to configure the target controlling appliance such that the identified plurality of command codes are available to allow the target controlling appliance to control operations of each of the target controlled appliance.

9. A method for using a remote control having a memory to configure a target controlling appliance to communicate with a target controlled appliance, the method comprising:

accepting configuration data which is used to identify a plurality of command codes in a first command code library that are recognizable by the target controlled appliance such that the identified plurality of command codes are available to allow the remote control to control operations of the target controlled appliance;

storing the configuration data in the memory;

creating a configuration message using the configuration data read from the memory; and transmitting the configuration message to the target controlling appliance where the target controlling appliances uses the configuration message to identify a plurality of command codes in a second command code library that are recognizable by the target controlled appliance to configure the target controlling appliance such that the identified plurality of command codes are available to allow the target controlling appliance to control operations of the target controlled appliance.

10. In a remote control having a memory, a readable media having instructions for use in configuring a target controlling appliance to communicate with a target controlled appliance, the instructions performing steps comprising:

accepting configuration data which is used to identify a plurality of command codes in a first command code library that are recognizable by the target controlled appliance such that the identified plurality of command codes are available to allow the remote control to control operations of the target controlled appliance;

storing the configuration data in the memory;

creating a configuration message using the configuration data read from the memory; and transmitting the configuration message to the target controlling appliance where the target controlling appliances uses the configuration message to identify a plurality of command codes in a second command code library that are recognizable by the target controlled appliance to configure the target controlling appliance such that the identified plurality of command codes are available to allow the target controlling appliance to control operations of the target controlled appliance.

11. The readable media as recited in claim 10, wherein the configuration message further comprises device data representative of a type of the target controlled appliance.

12. The readable media as recited in claim 10, wherein the configuration message comprises a unique custom code value that allows the controlling target device to distinguish between the configuration message and a command message.

* * * * *